United States Patent

Bartley et al.

[11] Patent Number: 5,329,657
[45] Date of Patent: Jul. 19, 1994

[54] QUICK RELEASE COUPLING FOR HEAD SECTION OF A HOSPITAL BED

[75] Inventors: Gary L. Bartley, Kalamazoo Township, Kalamamoo County; Christopher J. Hopper, Oshtemo Township, Kalamazoo County; Louis A. Haddock, Jr., Emmett Township, Calhoun County; John S. Messner, Battle Creek, all of Mich.

[73] Assignee: Stryker Corporation, Kalamazoo, Mich.

[21] Appl. No.: 964,582

[22] Filed: Oct. 21, 1992

[51] Int. Cl.[5] .................. A61G 7/015; A61G 7/018
[52] U.S. Cl. .......................... 5/617; 5/616; 74/89.14; 74/89.15
[58] Field of Search .............. 5/617, 618, 613, 616; 192/81 C, 1.37; 74/89.14, 89.15

[56] References Cited

U.S. PATENT DOCUMENTS 4,038,709 8/1977 Kerwit ..................... 5/618
4,222,131 9/1980 Holdt et al. .............. 5/617
4,346,487 8/1982 Holdt et al. .............. 5/617
4,559,655 12/1985 Peck ....................... 5/617

Primary Examiner—Alexander Grosz
Attorney, Agent, or Firm—Flynn, Thiel, Boutell & Tanis

[57] ABSTRACT

A hospital bed includes an articulatable patient support with a fowler portion movable between horizontal and inclined positions relative to a frame of the bed. A reversible electric drive motor is supported on the frame of the bed and, through a reduction gearing arrangement and a releasible coupling mechanism, can rotatably drive a threaded shaft. A nut engages and is held against rotation with the shaft, and a linkage arrangement couples the nut to the fowler portion to effect reciprocal movement of the fowler portion in response to reciprocal movement of the nut along the shaft. A manual release is provided on the fowler portion and, when actuated, disengages the releasible coupling mechanism so that the threaded shaft is free to rotate independently of the motor and gearing arrangement.

22 Claims, 7 Drawing Sheets

QUICK RELEASE COUPLING FOR HEAD SECTION OF A HOSPITAL BED

FIELD OF THE INVENTION

This invention relates to a hospital bed having a motor-driven fowler portion which supports a patient's head and upper torso in a horizontal or inclined position and, more particularly, to such a bed having an improved mechanism for selectively uncoupling the motor from the fowler portion.

BACKGROUND OF THE INVENTION

Existing hospital beds have a fowler portion which supports the head and upper torso of a patient and which can be pivoted from a horizontal position upwardly to various inclined positions. A common drive arrangement for the fowler includes a reversible electric motor which can rotatably drive a threaded shaft extending lengthwise of the bed, a nut which engages the threaded shaft and is held against rotation so that the nut moves axially along the shaft in response to rotation of the shaft, and a linkage which couples the nut to the fowler portion so that the fowler portion pivots in response to axial movement of the nut in order to alter the inclination of the fowler portion.

When a patient experiences a sudden trauma such as a heart attack while the fowler portion is in the inclined position, it is medically important that the fowler portion be pivoted downwardly as quickly as possible to an approximately horizontal position, so that appropriate therapy such as cardio-pulmonary resuscitation (CPR) can be administered. Also, there are times when the fowler must be operated without electrical power, for example to shorten the effective length of the bed so that it will fit into an elevator during patient transport. However, in most existing fowler drive arrangements, the threaded shaft has a relatively fine pitch and is rotated at a slow to moderate speed in order to permit slow and gentle movement of a patient during normal operation. In order to move the fowler portion to its horizontal position substantially more rapidly than is possible by using the electric motor, manually operable quick release arrangements have previously been developed to allow selective interruption of the driving connection between the rotating shaft and the fowler portion. One example of such a known quick release mechanism is disclosed in Peck U.S. Pat. No. 4 559 655. While this known mechanism has been generally adequate for its intended purposes, it has not been satisfactory in all respects.

For example, the quick release mechanism in this known apparatus includes a relatively bulky coupling mechanism which reciprocally moves lengthwise along the threaded shaft with the nut, and an appropriate clearance space must be provided along the entire range of movement of the nut to allow movement of this bulky coupling arrangement. Consequently, this known fowler drive mechanism is not very compact and requires the allocation of a relatively significantly amount of space beneath the patient support, which in some situations is undesirable or impractical.

An object of the present invention is to provide an improved quick release mechanism for a motor-driven fowler which permits the entire fowler drive arrangement to be relatively compact.

A further object provides such a mechanism which can be quickly and reliably released and re-engaged, and which requires little or no maintenance over its normal operational lifetime.

SUMMARY OF THE INVENTION

The objects and purposes of the present invention, including those set forth above, are met by providing a patient support apparatus which has thereon a patient support surface and is supported for movement between two positions, and a selectively actuable drive arrangement for effecting movement of the patient support part, the drive arrangement including a threaded shaft part supported for rotation about its lengthwise axis, a nut engaged with the shaft and held against rotation, an arrangement coupling the nut to the support part for effecting movement of the support part in response to axial movement of the nut along the shaft, a selectively actuable motor which can effect rotation of an output shaft, and a releasible coupling arrangement for respectively effecting and interrupting a driving coupling of the output shaft to the threaded shaft when respectively engaged and disengaged.

BRIEF DESCRIPTION OF THE DRAWINGS

A preferred embodiment of the present invention is described in detail hereinafter with reference to the accompanying drawings, in which.

DETAILED DESCRIPTION

Figure 1:
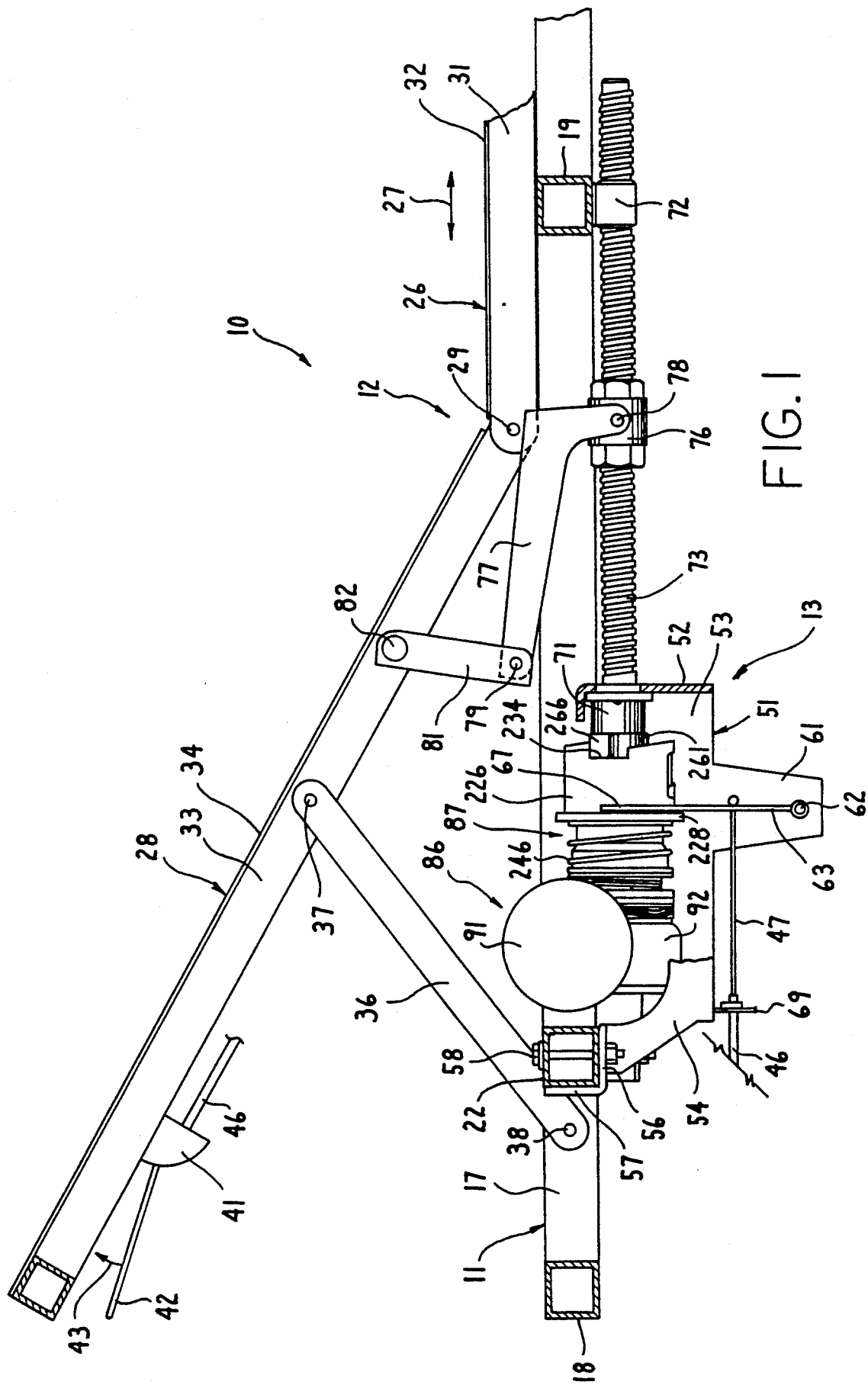
FIG. 1 is a diagrammatic sectional side view of part of a hospital bed embodying the present invention.

FIG. 1 shows part of a hospital bed 10 which embodies the present invention. The bed includes a metal frame 11, an articulatable patient support 12 provided on the frame 11, and an articulation control mechanism 13 for controlling the patient support 12.

Figure 2:
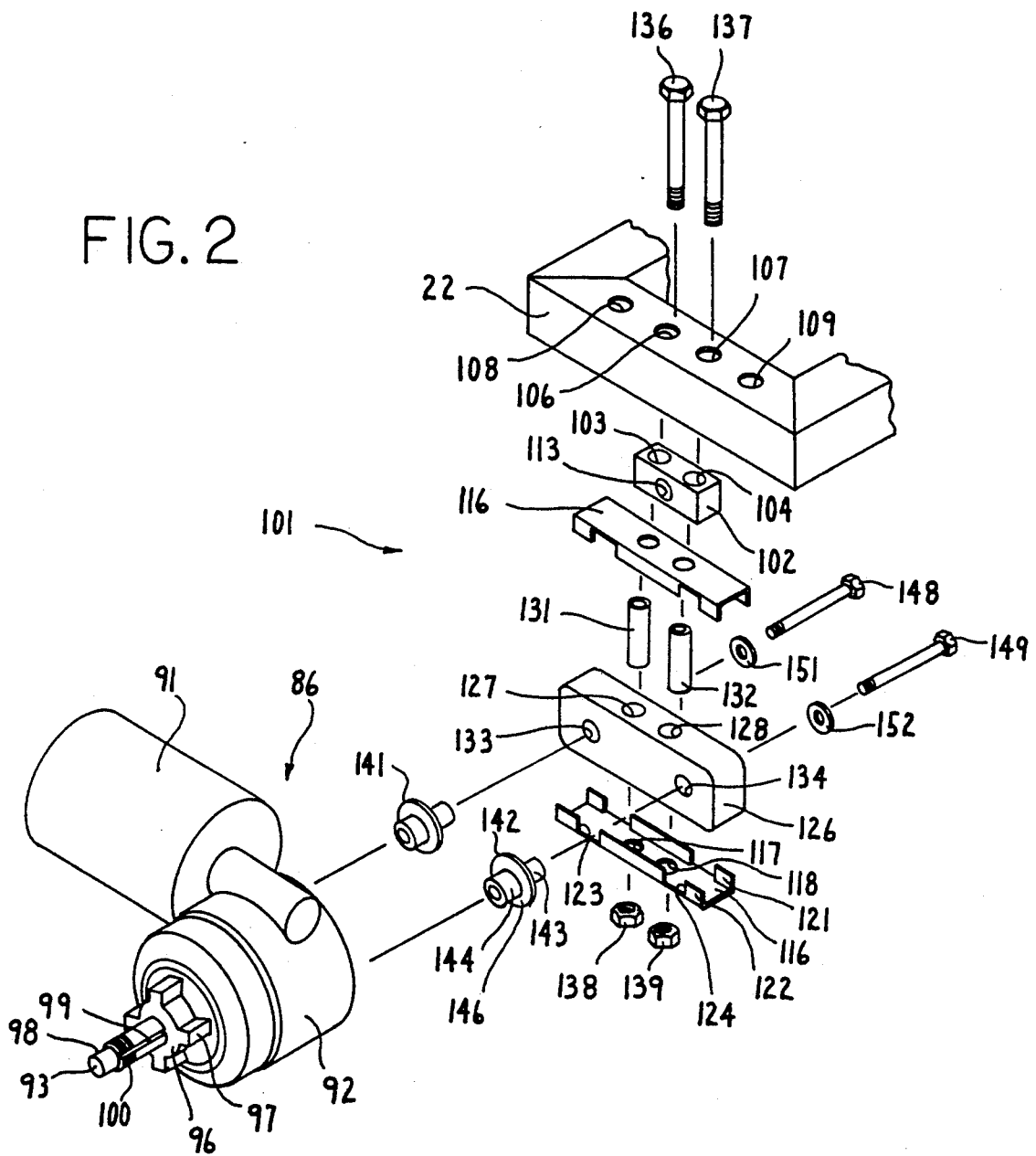
FIG. 2 is an exploded perspective view of a support arrangement for a drive motor which is a component of the bed of FIG. 1.
Figure 3:
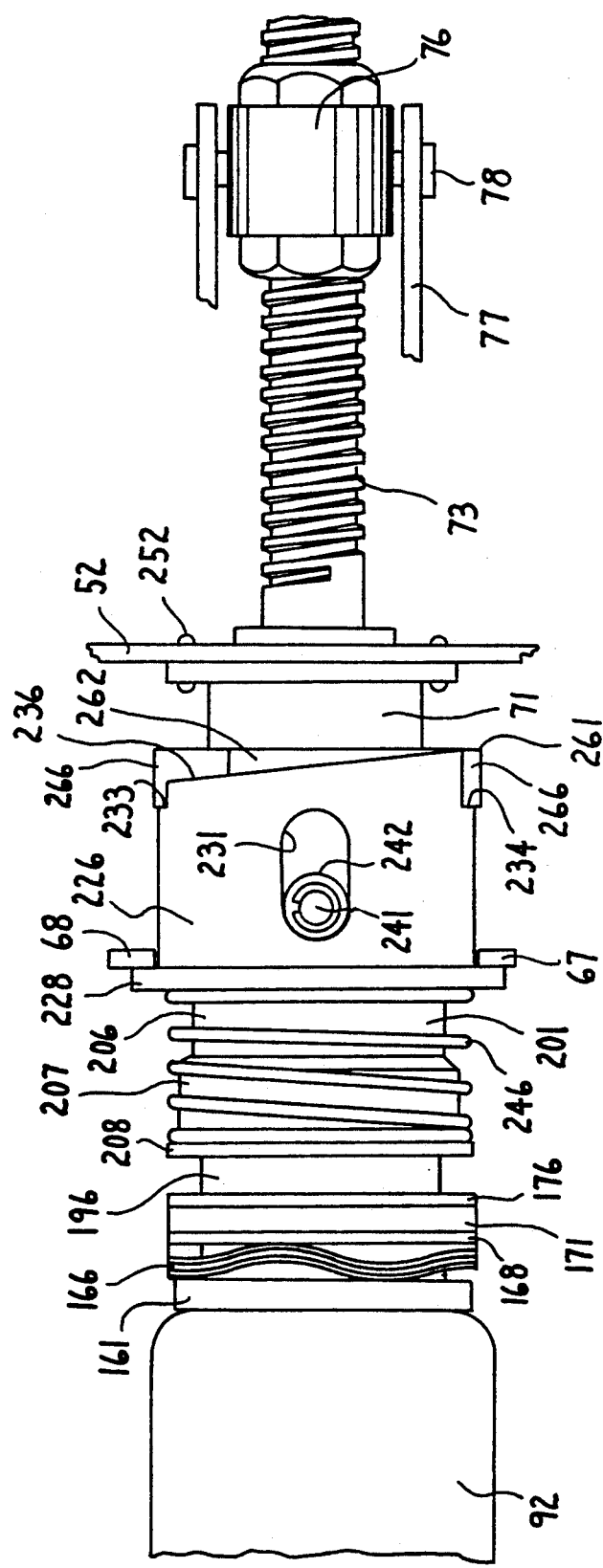
FIG. 3 is a fragmentary top view of a coupling mechanism which is part of the bed of FIG. 1.
Figure 4:
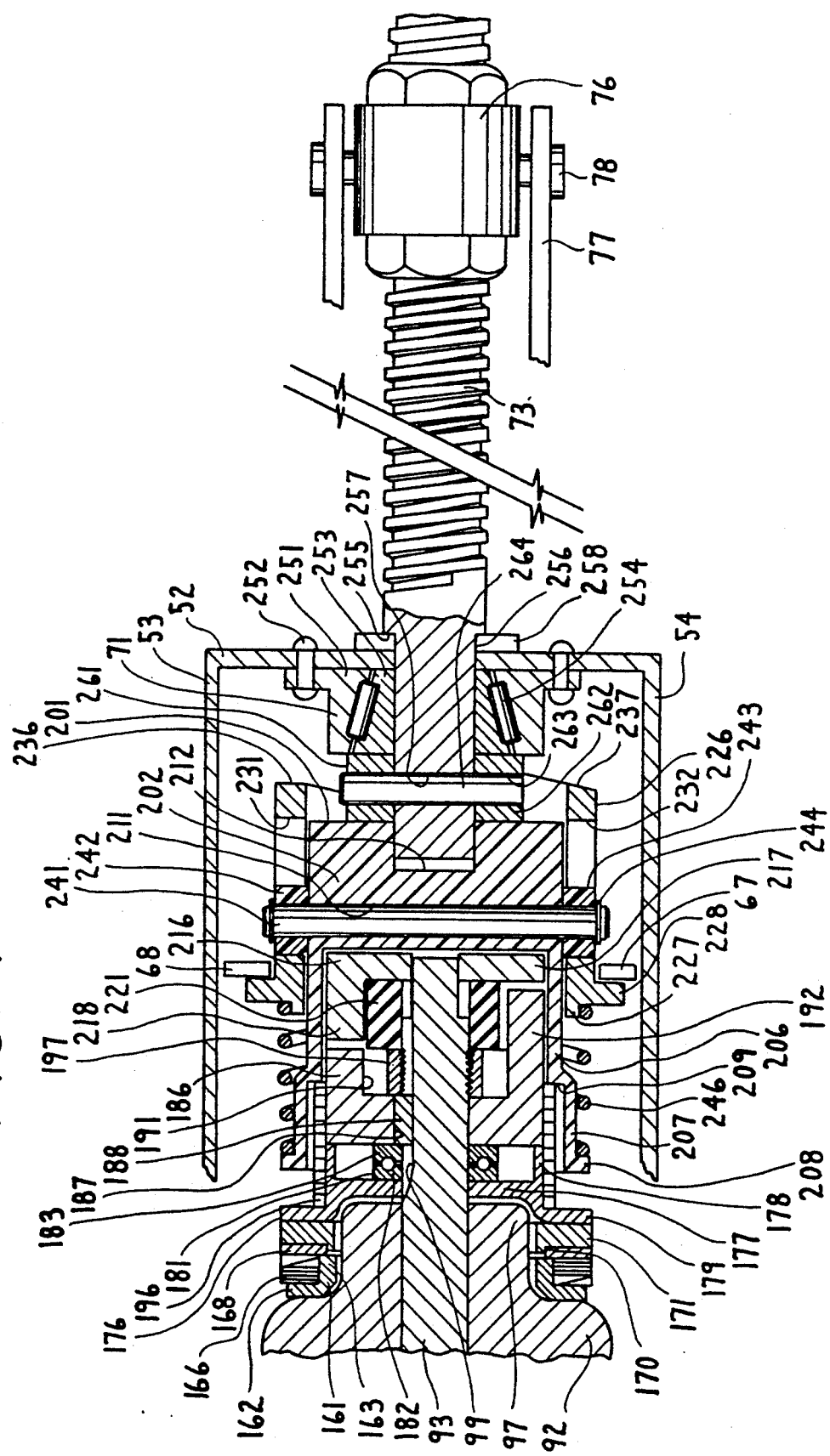
FIG. 4 is a fragmentary sectional top view of the coupling mechanism of FIG. 3 with rotational parts thereof rotated by 90 degrees from the view of FIG. 3.
Figure 5:
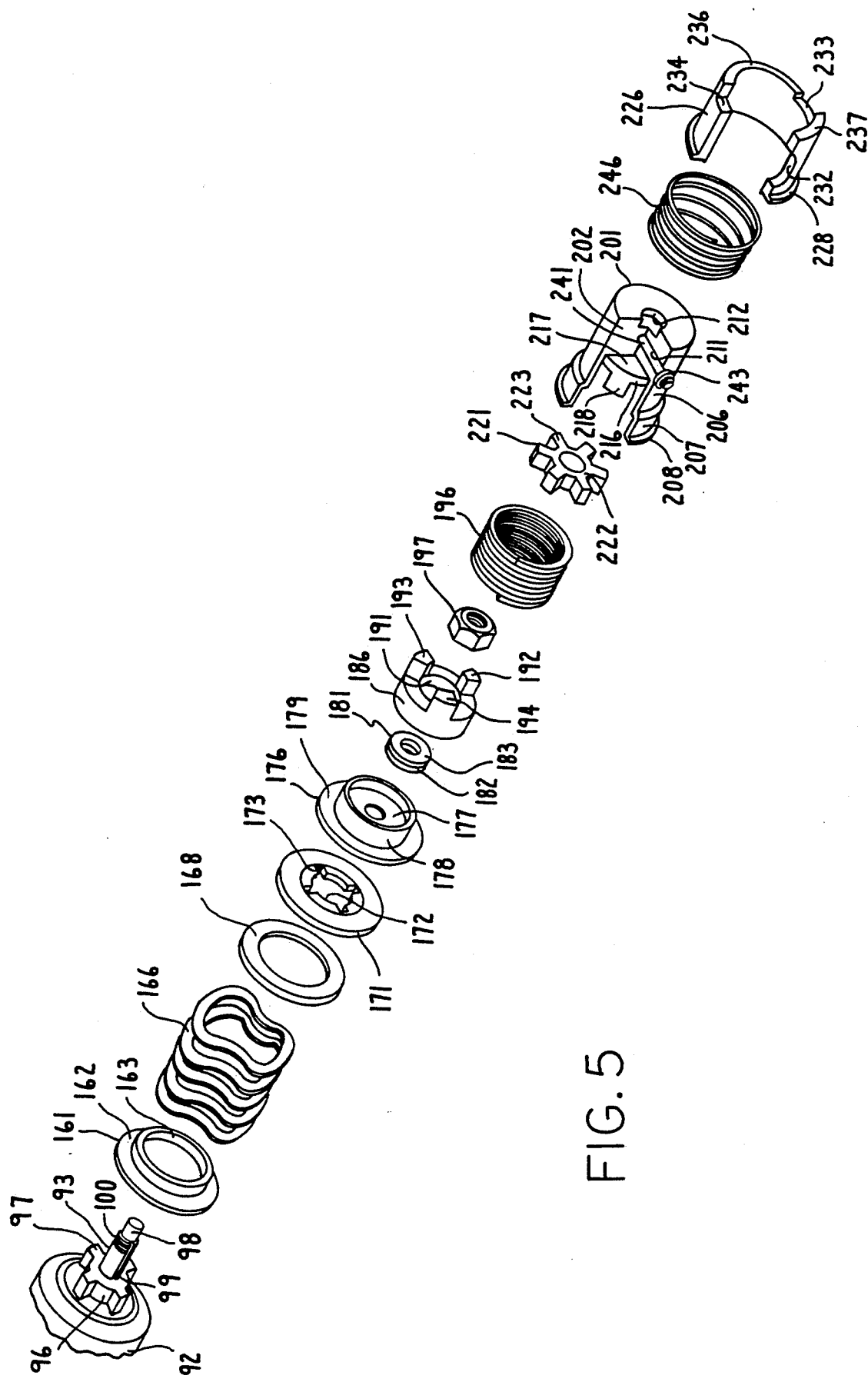
FIG. 5 is an exploded perspective view of the coupling mechanism of FIG. 3.
Figure 6:
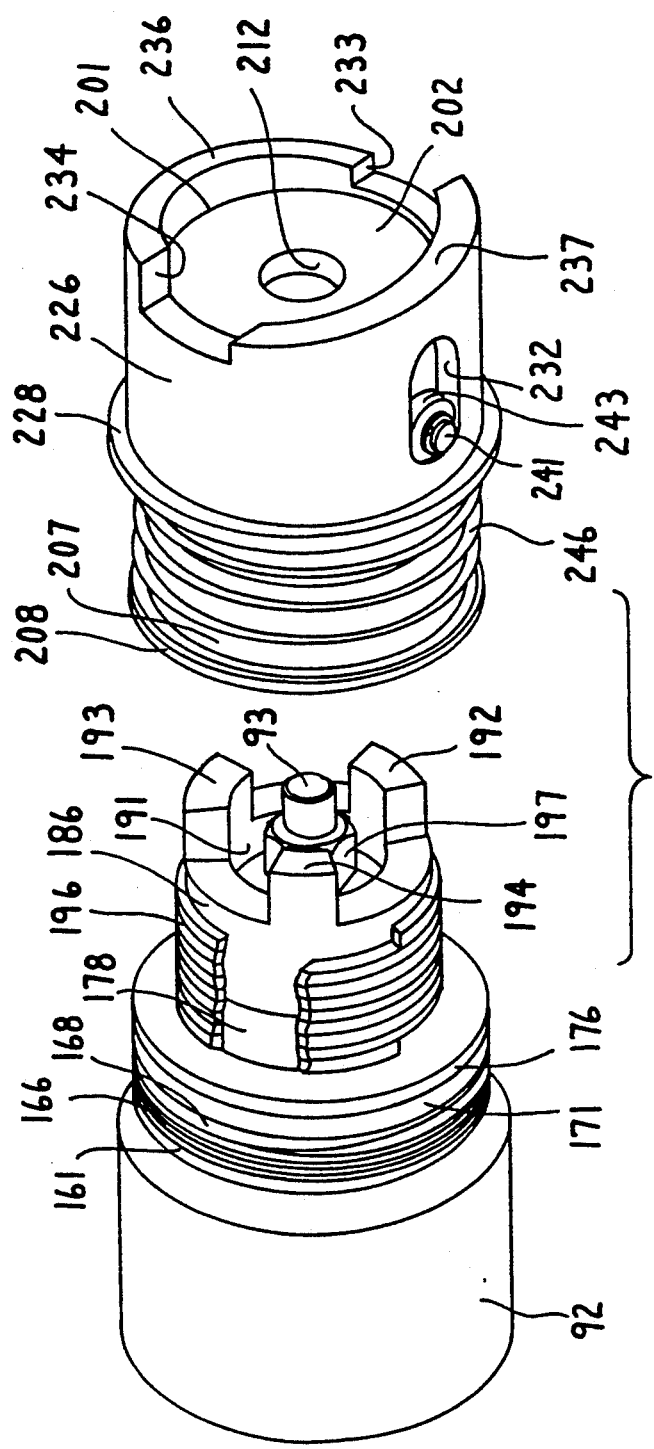
FIG. 6 is a partially exploded perspective view of the coupling mechanism of FIG. 3.

The frame 11 includes two spaced side members 17, one of which is visible in FIG. 1, and two transverse members 18 and 19 which extend between and are fixably secured to the side members 17. In the preferred embodiment, the members 17-19 are each made from a metal tube of square cross section, and could also be open section channels. The frame 11 also includes a U-shaped member having a bight 22 which serves as a drive mechanism support and having two spaced legs (FIG. 2) which are not shown in FIG. 1 but which each extend leftwardly in FIG. 1 from a respective end of the bight 22 and each have an outer end fixedly secured to the transverse member 18.

The articulatable patient support 12 includes a central portion 26 slidably supported in a conventional and not-illustrated manner on the frame 11 for movement in directions parallel to the arrows 27, and a fowler portion 28 supported for pivotal movement about a pivot axis 29 relative to the central portion 26. The portion 26 has its own movable frame which is not essential to the invention and which has been omitted from the drawings for clarity. The fowler portion 28 is moveable from an approximately horizontally extending position upwardly through a range of progressively more inclined positions, one of which is shown in FIG. 1.

The central portion 26 of the patient support has an approximately rectangular frame 31 and a patient support plate 32 secured on the upper side thereof, and the fowler portion 28 also has an approximately rectangular frame 33 and a support plate 34 thereon. A conventional mattress or pad is normally provided on the support plates 32 and 34, but has been omitted in FIG. 1 for clarity. The central portion 26 serves as a seat for a patient, and the fowler portion 28 supports the upper body of the patient.

Two support links 36 are provided on respective sides of the bed, one of which is visible in FIG. 1. Each support link 36 has one end pivotally supported at 37 on the fowler portion 28, and its opposite end pivotally supported at 38 on a side member 17 of the frame 11. A bracket 41 is secured to the frame of the fowler portion 28, and supports a manually operable lever 42 for pivotal movement in the direction indicated by arrow 43. In a conventional manner, the lever 42 controls a cable which extends to the lower portion of FIG. 1 and which has a sleeve 46 with an elongate wire 47 slidably supported therein. Movement of lever 42 causes the wire 47 to slide lengthwise within the sleeve 46.

A U-shaped bracket 51 made of sheet metal has a bight 52 and two spaced, parallel legs 53 and 54. Each of the legs 53 and 54 has, at an end remote from the bight 52, a laterally outwardly projecting horizontal flange 56 which is disposed against an underside of the drive mechanism support 22, and has a further flange 57 which projects upwardly from an edge of the horizontal flange 56 and which is disposed against a side surface of the support 22. The bracket 51 is fixedly secured to the support 22 by a pair of bolts 58 and associated nuts, each bolt 58 extending through aligned openings in the support 22 and flange 56. Each of the legs 53 and 54 of the bracket 51 has a downwardly projecting flange portion 61, and a pivot pin 62 extends between and has its ends fixedly secured to the flange portions 61. An actuating plate 63 has its lower end pivotally supported on the pivot pin 62, and has at its upper end two upwardly projecting and transversely spaced legs 67 and 68. A flange 69 is secured to and projects downwardly from the legs 53 and 54 of the bracket, and has fixedly secured to it the end of sleeve 46 which is remote from bracket 41 and lever 42. The end of wire 47 remote from lever 42 extends outwardly from the sleeve 46 and has its outer end coupled to the actuating plate 63. When the lever 42 is manually pivoted in the direction of arrow 43, the wire 47 is pulled leftwardly in FIG. 1, so that the actuating plate 63 is in turn pivoted counterclockwise in FIG. 1.

A thrust bearing 71 is secured to the bight 52 of bracket 51, and a further bearing 72 is supported on the transverse member 19 of the frame 11. The bearing 72 could alternatively be supported on the central portion 26, in which case it would move with central portion 26 with the shaft 73 sliding within it. A threaded shaft 73 has its ends rotatably supported by the bearings 71 and 72, and is held against axial movement. A nut 76 threadedly engages the shaft 73 between bearings 71 and 72, and a fowler link 77 has one end pivotally coupled at 78 to the nut 76 and its other end pivotally coupled at 79 to one end of a fowler control arm 81. The opposite end of the fowler control arm 81 is welded to a cylindrical rod 82 which in turn is fixedly secured to the frame 33 of the fowler portion 28. The fowler control arm 81 and fowler link 77 prevent the nut 76 from rotating about the axis of the threaded shaft 73. Thus, as the shaft 73 rotates, the nut 76 moves axially along the shaft 73. This in turn causes the fowler portion 28 to pivot upwardly or downwardly relative to the frame 11, while the central portion 26 respectively slides leftwardly or rightwardly in FIG. 1.

The articulation control mechanism 13 includes a drive assembly 86 which is supported by the drive mechanism support 22 in a manner described in more detail below, and includes a releasable coupling 87 which can releasably drivingly couple the drive assembly 86 to the threaded shaft 73 in a manner described in more detail later.

The drive assembly 86 (FIG. 2) is a conventional commercially available part from the Motor Division of Emerson Electric Company of St. Louis, Missouri, as part number K37XYA223696, but will be briefly described to the extent necessary to ensure an understanding of the present invention. More specifically, the drive assembly 86 includes a unitary housing which has a portion 91 containing a reversible electrical motor and a portion 92 containing a reduction gear mechanism. A rotatable output shaft 93 projects outwardly from the portion 92 of the housing, and is rotatably driven by the motor through the reduction gear mechanism. The housing portion 92 includes an annular collar 96 encircling the shaft 93, and four ribs 97 which project radially outwardly from the collar 96 at equally angularly spaced intervals. The shaft 93 has an end portion 98 of reduced diameter, and has an axially extending keyway 99 in the portion between the collar 96 and end portion 98. The portion between collar 96 and end portion 98 also has external threads 100 adjacent end portion 98.

The drive assembly 86 is supported on the drive mechanism support 22 by a support assembly 101. The support assembly 101 includes a metal spacer 102 of rectangular shape which has spaced vertical holes 103 and 104 aligned with spaced vertical holes 106 and 107 provided through the support 22, the holes 106 and 107 being disposed between spaced vertical holes 108 and 109 in support 22 which each receive a respective one of the bolts 58 (FIG. 1). The spacer 102 also has a hole 113 extending horizontally therethrough intermediate the holes 103 and 104.

Two mounting plates 116 are identical, except that one has an inverted orientation with respect to the other. As shown for the lower mounting plate, the mounting plates 116 each have spaced holes 117 and 118 which are aligned with the holes 103 and 104 in spacer 102, and have edge portions 121 and 122 bent at a right angle to the central portion so as to define flanges which project downwardly from opposite sides of the upper mounting plate and upwardly from opposite sides of the lower mounting plate. Each of the flanges 121 and 122 has a pair of spaced cutouts 123 and 124.

An isolator member 126, which is a rectangular block of neoprene rubber, is disposed between the mounting plates 116 and has two vertical holes 127 and 128 which are aligned with the holes 117 and 118 in the mounting plates and which each have disposed therein a respective one of two metal spacer sleeves 131 and 132. Each of the spacer sleeves 131 and 132 has a vertical height equal to the vertical height of the isolator member 126, and has each of its ends disposed against a respective one of the mounting plates 116. The isolator member 126 also has two horizontally extending holes 133 and 134 which are spaced outwardly from the holes 127 and 128 and which are each aligned with a respective one of the cutouts 123 and 124. Two bolts 136 and 137 each extend through one of the holes 106 and 107 in the support member 22, one of the holes 103 and 104 in the spacer member 102, one of the holes 117 and 118 in each of the mounting plates 116, and one of the sleeves 131 and 132 in the holes 127 and 128 of the isolator member 126, and each have a respective nut 138 or 139 on the lower end thereof to securely clamp all of these components to each other.

Two identical tubular mounting posts 141 and 142 are each made of nylon. As shown for the mounting post 142, each has end portions 143 and 144 of different diameter and a disk portion 146 which is disposed between and has a diameter greater than that of portions 143 and 144. The portion 143 of each mounting post 141 and 142 extends into a respective one of the horizontal holes 133 and 134 in the isolator member 126, and has a length approximately equal to the width of the isolator member 126, the disk portion 146 of each mounting post being disposed against a side surface of the isolator member 126. Two bolts 148 and 149 each extend through a respective washer 151 or 152 and through a respective one of the mounting posts 141 and 142, and each threaded engage a respective one of two not-illustrated threaded openings in the housing portion 92 of the drive assembly.

The neoprene rubber isolator member 26 provides both electrical and mechanical isolation for the drive assembly 86 with respect to metal support member 22.

The releasable coupling 87 of FIG. 1 is shown in more detail in FIGS. 3–6. It includes an annular metal spring holder 161 with an annular flange 162 which extends radially outwardly and an annular flange 163 which extends axially. The inside diameter of the spring holder 161 is only slightly larger than the distance between the radially outer ends of opposite ribs 97 on the drive housing, and the spring holder 161 closely encircles the ribs 97. Six metal spring washers which serve as brake springs encircle the axial flange 163 of the spring holder 161. More or fewer spring washers could be used, depending on the requirements of the particular design. A brake washer 168 encircles the ribs 97 on the outside of springs 166 remote from the spring holder 161, but is held in a position radially spaced from the ribs through enlargement of its radially inner edge with a shallow annular recess 170 in a plastic brake disk 171.

The brake disk 171 has a central opening 172 with a diameter slightly larger than the diameter of the collar 96 on the drive housing, and has four rectangular notches 173 at equal angular intervals which each receive a respective one of the ribs 97. The brake disk 171 is held against rotation with respect to the drive housing by the cooperation between the notches 173 and the ribs 97 on the housing.

A brake cup 176 made of metal has an axially extending cylindrical wall 178 with a radially extending wall 177 therein near one end, and also has a radially extending braking flange 179 at that end. The flange 179 has an axially facing annular surface which slidably engages an axially facing annular surface on the brake disk 171. The output shaft 93 of the drive mechanism extends rotatably through a central opening in the radial wall 177. A conventional thrust bearing 181 has two races 182 and 183 which encircle the output shaft 93, the race 182 being disposed against the radial wall 177 of the brake cup 176. A plurality of ball bearings or needle bearings are disposed between the races.

A metal driving member 186 has a central opening 187 through which the output shaft 93 extends, the central opening 187 having a key slot containing a key 188 which engages the keyway 99 in the output shaft 93, thereby preventing relative rotation of the driving member 186 and output shaft 93. One side of the driving member 186 engages the race 183 of the bearing 181, and the other side has a shallow circular recess 191. Three projections 192-194 at equal angular intervals extend axially in a direction away from bearing 181. The driving member 186 has an outside diameter which is substantially equal to the outside diameter of the axial wall 178 on brake cup 176. A helical clutch spring 196 has an inside diameter which is slightly less than the outside diameters of driving member 186 and axial wall 178 of brake cup 176, is made of spring wire of square cross section, and closely encircles each of these two components. A nut 197 is disposed in the recess 191 of driving member 186 and engages the threads 100 on output shaft 93, in order to maintain the driving member 186, bearing 181, brake cup 176, brake disk 171, brake washer 168, brake springs 166 and spring holder 161 in position on the housing portion 92. The nut 197 is tightened sufficiently so that the brake springs 166 are axially compressed between the flange 162 of spring holder 161 and the brake washer 168, and thus the springs 166 continuously resiliently urge the brake disk 171 against the braking flange 179 on the brake cup 176, producing friction between them which tends to resist rotation of the brake cup 176 relative to the brake disk 171 and thus relative to the housing 92, because the ribs 97 thereon hold the brake disk 171 against rotation.

A cup-like isolation member 201 has an end wall 202, and has projecting axially outwardly from one side of the end wall 202 an annular wall which includes a portion 206 with an inside diameter slightly larger than the outside diameter of driving member 186 and a portion 107 with an inside diameter slightly greater than the outside diameter of helical clutch spring 196. An annular step 209 between the portions 206 and 207 can engage an end of the clutch spring 196 in order to prevent any significant axial movement of the clutch spring 196. The outer end of the portion 207 has a radially outwardly projecting annular flange 208. The end wall 202 has a radial bore 211 extending transversely through it, and has a blind bore 212 extending axially into it on a side remote from wall portions 206 and 207. The isolation member 201 is made of a durable and electrically nonconductive synthetic material, such as the material commercially available under the name DELRIN.

A driven member 216 is disposed within the portion 206 of the isolator member 201. The driven member 216 is made of an insulating material, such as 30% glass-filled nylon. The driven member 216 has a disk-like portion 217 which is disposed against end wall 202 and fixedly secured thereto by three not-illustrated screws, and has three axial projections 218 at equal angular intervals which extend toward the driving member 186 and are each disposed angularly between a respective pair of the projections 192-194 on the driving member 186. Although the driven member 216 and isolator member 201 are shown as separate parts in the figures, it will be recognized that they could be a single integral component. The disk-like portion 217 has a central opening which rotatably receives the reduced diameter portion 98 of output shaft 93.

A rubber spider 221 has an annular hub 222 which encircles the output shaft 93 at a location axially between the driving member 186 and driven member 216, and has six radially outwardly projecting arms 223 which are each located angularly between a respective one of the projections 192-194 on driving member 186 and a respective one of the projections 218 on the driven member 216.

A sleeve-like metal decoupling member 226 has an inside diameter slightly larger than the outside diameter of the end wall 202 of isolator member 201, and is axially slidably supported on the end of isolator member 201 having end wall 202. The decoupling member 226 has at one end an annular axial lip 227, and has a radially outwardly projecting annular flange 228 adjacent the lip 227. The decoupling member 226 also has two axially extending slots 231 and 232 on diametrically opposite sides thereof, and has two approximately rectangular notches extending axially into the end thereof remote from lip 227, the notches 233 and 234 being diametrically opposite each other. Two inclined ramp surfaces 236 and 237 are provided on the same end of the decoupling member 226 as the notches, each of the ramp surfaces having ends which are axially offset with respect to each other and are respectively adjacent the notches 233 and 234.

A metal pin 241 extends through the radial bore 211 in the end wall 202 of isolator member 201 so that its ends are each disposed within one of the slots 231 and 232, and has rollers 242 and 243 rotatably supported on its ends within the slots and held in place by respective snap rings 244. The rollers 242 and 243 are each made of a durable nonconductive synthetic material, such as DELRIN. The rollers 242 and 243 each have a diameter which is slightly less than the width of the associated slot 231 or 232, so that the rollers 242 and 243 can roll on the walls of the slots.

A helical compression spring 246 encircles the isolator member 201, has one end disposed against the radial flange 208 on isolator member 201, and has its opposite end encircling lip 227 and disposed against radial flange 228 on the decoupling member 226. The spring 246 yieldably urges the decoupling member 226 rightwardly in FIG. 4 relative to the isolator member 201, so that the rollers 242 and 243 are disposed at the left ends of the slots 231 and 232.

Turning to the previously-mentioned bearing 71, the bearing includes an outer race 251 with a flange which is secured by rivets 252 to the bight 52 of bracket 51. An inner race 253 is disposed within the outer race 251, and the races have facing frustoconical surfaces with cylindrical roller bearings 254 disposed therebetween. The threaded shaft 73 has a nonthreaded end portion 256 of reduced diameter which is separated from the remainder of the shaft by a step 255, which extends through inner race 253, which has its outer end rotatably disposed in the blind bore 212 in isolator member 201, and which has extending through it between isolator member 201 and bearing 71 a transverse radial bore 257. A roller thrust bearing 258 is disposed between the bight 52 of bracket 51 and the annular step 255 on shaft 73.

A metal wing member 261 has an annular hub 262 which encircles the end portion 256 of shaft 73 between isolator member 201 and bearing 71, and which has a transverse radial bore 263 therethrough. A pin 264 is disposed in the bore 263 in wing member 261 and in the transverse bore 257 in the shaft 73 so as to prevent relative rotation therebetween. The wing member 261 has two radially outwardly projecting wing portions 266 on diametrically opposite sides thereof, each wing portion 266 having an approximately rectangular cross section.

OPERATION

Figure 7:
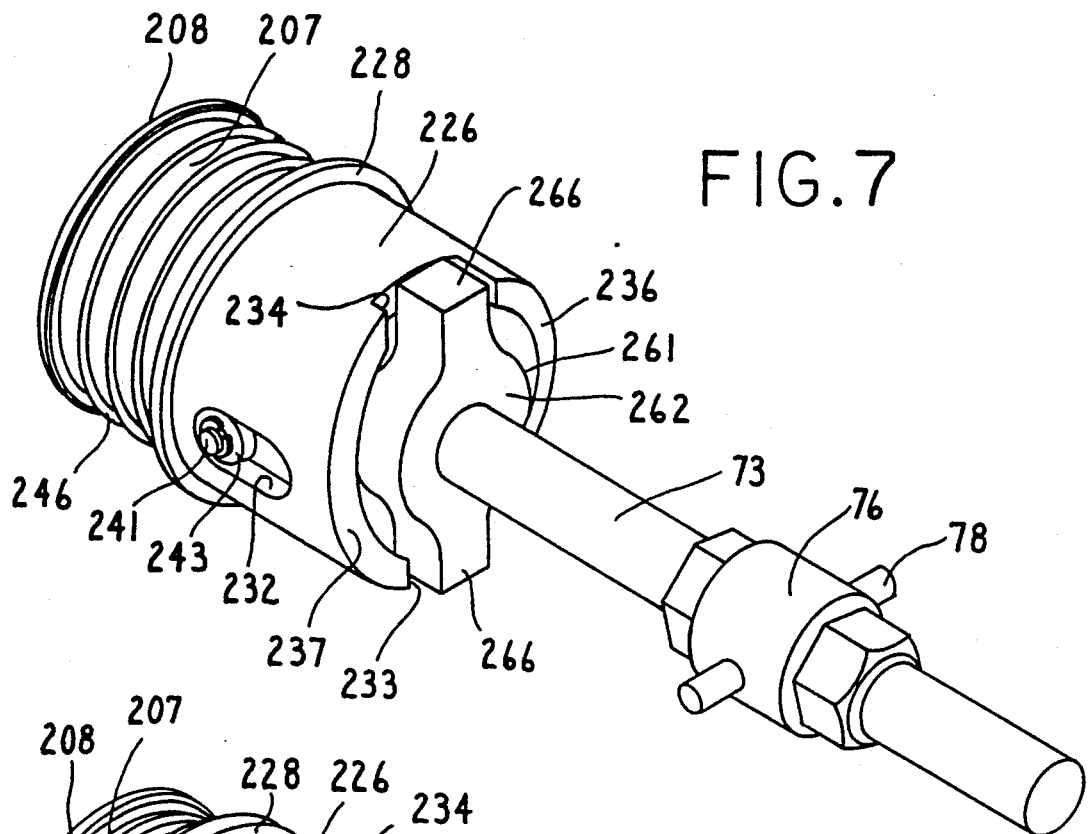
FIGS. 7 and 8 are similar perspective views of the coupling mechanism of FIG. 3 and show respective modes of operation in which the coupling mechanism is respectively engaged and disengaged.

When the reversible electric motor is energized and rotates the output shaft 93 of the drive assembly in a first direction, the driving member 186 is rotated in the same direction by the output shaft 93. In this direction of rotation, the friction between driving member 186 and clutch spring 196 tends to unwind the clutch spring 196 a small amount, which reduces the friction to a point where the driving member 186 rotates independently of the clutch spring 196, and thus also rotates relative to the brake cup 176, rotation of which is yieldably resisted by its frictional engagement with the brake disk 171 under the axial pressure of braking springs 166. It is also possible for the spring 196 to rotate with member 186 relative to brake cup 176. The thrust bearing 181 facilitates rotation of the driving member 186 relative to brake cup 176 without friction therebetween. The axial projections 192-194 on the driving member 186 cooperate with the projections 218 on the driven member 216 through the arms 223 of spider 221 to rotate the driven member 216 in synchronism with driving member 186, the driven member 216 in turn rotating the isolator member 201 to which it is fixedly secured. The spider 221 provides vibration and shock damping to avoid stripping gears in the gear reduction mechanism, primarily during high-speed re-engagement. Through the pin 241 and rollers 242 and 243, the decoupling member 226 is rotated with the isolator member 201. During normal operation, the decoupling member 226 is in the axial position shown in FIGS. 4 and 7, in which the two wings 266 on the wing member 261 engage the notches 233 and 234 in the decoupling member 226, so that the wing member 261 is rotated by the decoupling member 226 and in turn, through pin 264, rotates the threaded shaft 73. As a result of rotation of threaded shaft 73, the nut 76 will move axially along shaft 73 in a leftward direction in FIG. 1, which causes the fowler portion 28 to pivot upwardly about pivot axis 29 (clockwise in FIG. 1). When the fowler portion 28 is at a desired position, the electric motor is de-energized to stop the fowler portion in this position.

The weight of a patient on the fowler portion 28 will tend to urge the nut 76 rightwardly in FIG. 1, which in turn will urge rotation of the shaft 73 in a second direction opposite the first direction. Depending on the particular motor and reduction gearing used, it is possible that, when the motor is de-energized, the forces generated by patient weight on the fowler could, particularly in the case of a heavy patient, be sufficient to turn the rotor of the de-energized motor through the reduction gearing. As a result, the fowler 28 would not remain in the position selected by the operator, but would pivot downwardly toward its horizontal position. This phenomena is effectively eliminated in the apparatus according to the present invention. In particular, if forces acting on the fowler and urging rotation of the screw 73 in the second direction become sufficient to actually cause a small amount of rotation of driving member 186 and output shaft 93 in the second direction, the friction between the driving member 186 and spring 196 will urge the spring in the direction which tightens the coils of the spring, thus causing the spring to tightly grip both the driving member 186 and the brake cup 176, thereby preventing the driving member 186 from rotating relative to the brake cup 176. The driving member 186 thus can rotate in the reverse direction only if the torque applied to it is sufficient to overcome the friction between the braking surfaces on the brake disk 171 and flange 179 of the brake cup 176. The brake springs 166 are selected to produce an axial force generating a degree of friction between these braking surfaces which is more than adequate to prevent rotation of the driving member 186 in response to downward forces applied to the fowler.

If an operator decides at some point that the inclination of the fowler is to be reduced, then the electric motor is energized in a manner causing it to rotationally drive the output shaft 93 in the second direction. As the shaft 93 starts to rotate the driving member 186 in the second direction, the clutch spring 196 will couple the driving member 186 to the brake cup 176 in the manner described above, but in the preferred embodiment the electric motor and reduction gearing are selected to provide an output torque sufficient to overcome the friction between the brake cup 176 and brake disk 171, and thus through the coupling assembly 87 the shaft 73 is rotated in the second direction by the motor so that the nut 76 moves progressively rightwardly in the FIG. 1 and lowers the fowler portion 28.

If, when the fowler portion 28 is in a raised position such as that shown in FIG. 1, a patient experiences a trauma such as a heart attack, it is important to rapidly lower the fowler portion 28 to a horizontal position so that appropriate therapy such as cardio-pulmonary resuscitation (CPR) can be administered. In order to move the fowler portion 28 to the horizontal position substantially faster than is possibly using the motor in drive mechanism 86, or in situations where the fowler portion must be manually moved in the absence of electric power, an attendant manually presses the lever 42 (FIG. 1) in the direction of arrow 43, which causes the wire 47 to be pulled leftwardly within the sleeve 46 of the cable. This in turn pivots the actuating plate 63 counterclockwise in FIG. 1 about the pivot axis 62, so that the legs 67 and 68 thereof (FIGS. 1 and 3) slide the decoupling member 226 leftwardly in FIG. 3 against the urging of the spring 246. The rollers 242 and 243 facilitate this sliding movement of the decoupling member 226 regardless of any relative rotational torques which may exist between the pin 241 in isolating member 201 and the decoupling member 226.

As the decoupling member 226 moves leftwardly in the figures, the notches 233 and 234 therein move out of engagement with the wing portions 266 of the wing member 261, until the wing member 261 is axially offset from the decoupling member 226 and can freely rotate without any engagement with the decoupling member 226. At this point, the wing member 266 and shaft 73 can freely rotate in response to the rotational forces being applied to the shaft 73 by the nut 76 and downward forces acting on the fowler portion 28. Thus, the fowler portion 28 can be very rapidly lowered toward its horizontal position. Alternatively, the fowler portion 28 could be manually raised to a greater degree of inclination. In either case, when the fowler portion 28 has been moved to a desired position, the lever 42 is released.

Figure 8:
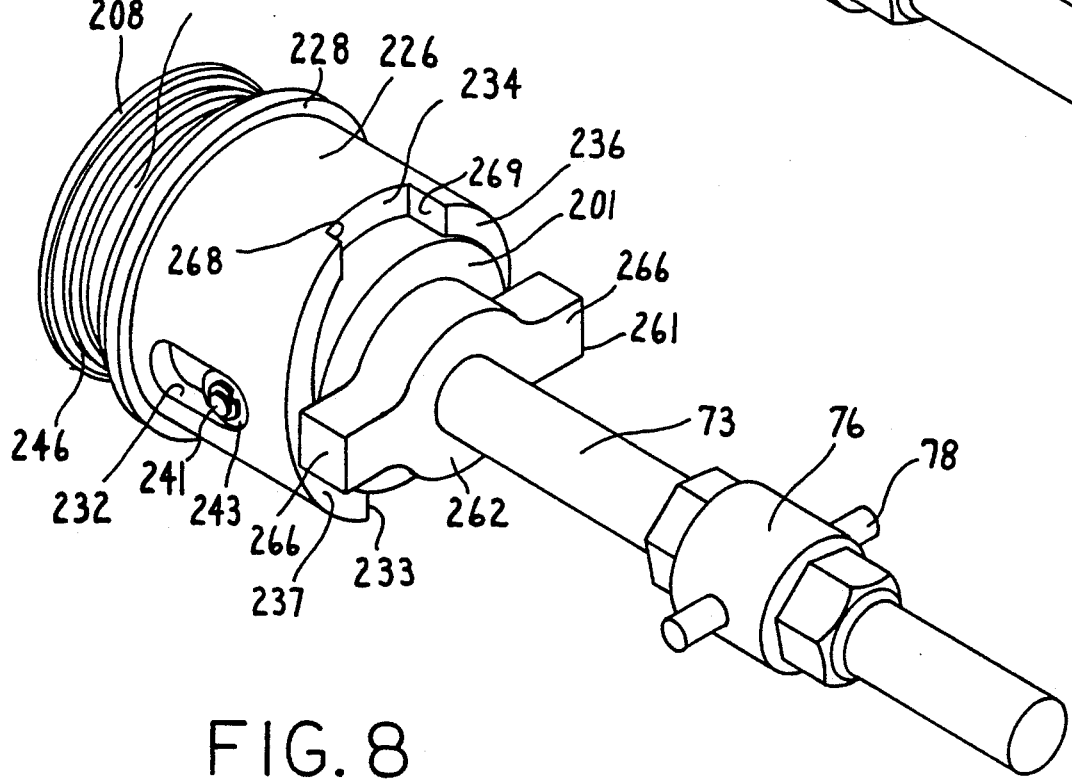

When lever 42 is released, the spring 246 urges the decoupling member 226 rightwardly, which in turn pivots the actuating plate 63 clockwise in FIG. 1 so that it pulls the wire 47 rightwardly and restores the lever 42 to its original position. It is possible to also provide an additional not-illustrated helical expansion spring which extends between the plate 63 and the bight 52 of the bracket, so that the legs 67 and 68 of plate 63 are pulled to a position spaced from the flange 228 in which they do not rub against the rotating flange to thereby avoid wear and audible noise. If the wing portions 266 are axially aligned with the notches 233 and 234, the decoupling member 226 will immediately move to its rightmost position (shown in FIGS. 3 and 7), in which the wing portions 266 are fully engaged with the notches 233 and 234. Usually, however, the wing portions 266 will be angularly offset from the notches and will move into engagement with the ramp surfaces 236 and 237, as shown in FIG. 8. As the fowler 28 then attempts to move still further downwardly, the shaft 73 and wing member 261 will rotate clockwise in FIG. 8, causing the wing portions 266 to slide along the ramp surfaces until they are aligned with the notches 233 and 234. As shown in FIG. 8 for the notch 234, each notch has side surfaces 268 and 269 which, due to the inclination of the ramp surfaces, are of different length. The inclination of the ramp surfaces is such that the wing portions 266 each rotate into alignment with a respective notch from the side of the notch having the shorter side surface 268, and thus the wing portions 266 cannot rotate past the notches 233 and 234 because each would engage the longer side surface 269 on the opposite side of the notch and thus have its rotation halted. The inclined ramp surfaces and the different length side surfaces 268 and 269 thus ensure that the wing portions 266 and the notches in decoupling member 226 promptly and reliably move into alignment when the lever 42 is released, even when the shaft 73 and wings are turning at a relatively high speed. The spring 246 then moves the decoupling member 226 rightwardly the rest of the way back to its original position, in which the wing portions 266 are fully received within the respective notches 233 and 234.

Although a single preferred embodiment has been disclosed in detail for illustrative purposes, it will be recognized that there are variations or modifications of the disclosed apparatus, including the rearrangement of parts, which lie within the scope of the present invention.

The embodiments of the invention in which an exclusive property or privilege is claimed are defined as follows:

1. A patient support apparatus, comprising: a support part which has thereon a patient support surface and is supported for movement between first and second positions, and selectively actuable drive means coupled to said patient support part for effecting movement thereof, said drive means including a threaded shaft supported for rotation about a lengthwise axis thereof, a nut engaged with said shaft and held against rotation, means coupling said nut to said support part for effecting movement of said support part in response to axial movement of said nut along said shaft, a selectively actuable motor which can effect rotation of an output shaft, and releasable coupling means for respectively effecting and interrupting a driving coupling of said output shaft to said threaded shaft when respectively engaged and disengaged.

2. An apparatus of claim 1, wherein said coupling means includes a radially extending wing on said threaded shaft, a decoupling member which is rotationally driven by said output shaft, which has therein a notch, and which is supported for reciprocal axial movement relative to said wing portion between first and second positions in which said notch is respectively engagable with and spaced axially from said wing portion, and manually operable means for effecting axial movement of said decoupling member from said first position to said second position.

3. An apparatus of claim 2, wherein said coupling means includes an isolation member made of a nonconductive material and nonrotatably coupled to said output shaft, said decoupling member being a sleeve which is axially slidably supported on said isolation member and is held against rotation with respect thereto, and includes resilient means yieldably urging axial movement of said decoupling member toward said first position.

4. An apparatus of claim 3, wherein said notch extends into said decoupling member from an axial end surface thereof, and wherein said decoupling member has on said axial end surface an inclined ramp surface which is slidably engagable with said wing portion and which has one end adjacent said notch.

5. An apparatus of claim 4, wherein said decoupling member has two of said notches therein at diametrically opposite locations, wherein said wing member has thereon two of said wing portions and said wing portions project radially outwardly in opposite directions, and wherein said decoupling member has two of said ramp surfaces thereon and said ramp surfaces each extend from a first side of a respective one of said notches to a second side of the other of said notches.

6. An apparatus of claim 5, wherein each said notch has a side surface on said first side thereof which is axially longer than a side surface on said second side thereof.

7. An apparatus of claim 3, wherein said decoupling member has an axially extending slot therein, and including a roller rotatably supported on said isolation member and disposed in said slot, said roller having a diameter which is less than a width of said slot.

8. An apparatus of claim 3, wherein said isolation member is cup-shaped and has therein a plurality of axial projections which are angularly offset, and including a driving member secured on said output shaft and having a plurality of axial projections which are each disposed between a respective pair of said axial projections on said isolation member and said driving member.

9. An apparatus of claim 8, including means for yieldably resisting rotation of said driving member.

10. An apparatus of claim 9, wherein said means for yieldably resisting includes a brake member having an outside diameter approximately equal to an outside diameter of an adjacent portion of said driving member, and a helical clutch spring encircling adjacent portions of said brake member and said driving member, said clutch spring permitting rotation of said driving member in a first direction with respect to said brake member, and yieldably resisting rotation of said driving member relative to said brake member in a second direction opposite said first direction.

11. An apparatus of claim 10, wherein said means for yieldably resisting rotation includes an axially movably supported brake disk which is held against rotation, and braking spring means for yieldably urging axial movement of said brake disk in a direction causing an axially facing annular surface on said brake disk to be urged against an axially facing annular surface on said brake member.

12. An apparatus of claim 1, including braking means for respectively permitting and yieldably resisting rotation of said drive shaft in directions respectively corresponding to upward and downward movement of said support portion when said coupling means is actuated.

13. An apparatus of claim 12, wherein said coupling means includes a driving member coupled to said output shaft for rotation therewith, said coupling means effecting selective coupling of said driving member to said threaded shaft; and wherein said braking means includes a rotatably supported brake member, said brake member and said driving member having adjacent portions of approximately equal diameter, and includes a helical clutch spring encircling said adjacent portions of said driving member and said brake member and having an inside diameter approximately equal to said outside diameters of said adjacent portions, said braking means including means for yieldably resisting rotation of said brake member.

14. An apparatus of claim 13, wherein said braking means includes a brake part which is axially movably supported on and held against rotation with respect to a housing of said drive means and which is thereon an annular brake surface which faces an annular brake surface provided on said brake member, and braking spring means yieldably urging said brake part axially toward said brake member so that said annular brake surfaces are urged toward each other.

15. An apparatus of claim 14, including an axial thrust bearing disposed between said brake member and said driving member, and a fastening part engaging said output shaft on a side of said driving member remote from said brake member, said fastening part preventing axial movement of said brake part, said brake member, said thrust bearing and said driving member under the urging of said braking spring means.

16. An apparatus of claim 15, wherein said fastening part is a nut which threadedly engages said output shaft, adjustment of the axial position of said nut on said output shaft adjusting the tension of said braking spring means, said braking spring means including a plurality of spring washers.

17. An apparatus of claim 1, wherein said selectively actuable motor is a reversible motor.

18. An apparatus of claim 1, wherein said motor is an electric motor.

19. An apparatus of claim 1, wherein said coupling means is normally engaged, and including manually operable means for selectively disengaging said coupling means.

20. An apparatus of claim 19, wherein said manually operable means includes a manually operable member movably supported on said patient support part.

21. An apparatus of claim 1, including an isolation member made of vibration damping material, an electrically nonconductive means fixedly supporting said isolation member on a frame of said patient support apparatus, and means supporting said drive means on said isolation member.

22. An apparatus of claim 21, wherein said coupling means includes a further isolation member which is made of an electrically nonconductive material and which facilitates a driving coupling to said output shaft to said threaded shaft.

* * * * *

UNITED STATES PATENT AND TRADEMARK OFFICE
CERTIFICATE OF CORRECTION

PATENT NO. : 5,329,657
DATED : July 19, 1994
INVENTOR(S) : Gary L. BARTLEY et al It is certified that error appears in the above-identified patent and that said Letters Patent is hereby corrected as shown below:

Column 11, line 4; after "wing" insert ---portion---.
           line 30; change "wing member" to ---threaded shaft---.

Column 12, lines 24 & 25; change "braking means" to ---means for yieldably resiting rotation---.
           line 27; change "is" to ---has---.
           line 66; change "to" to ---of---.

Signed and Sealed this

Eleventh Day of October, 1994

*Attest:*

BRUCE LEHMAN

*Attesting Officer*      *Commissioner of Patents and Trademarks*